(12) United States Patent
Murray et al.

(10) Patent No.: US 6,688,329 B2
(45) Date of Patent: Feb. 10, 2004

(54) WATER FEEDER CONTROLLER FOR BOILER

(75) Inventors: Christopher L. Murray, West Haven, CT (US); Richard A. Lyons, Hamden, CT (US)

(73) Assignee: C. Cowles & Company, New Haven, CT (US)

( * ) Notice: Subject to any disclaimer, the term of this patent is extended or adjusted under 35 U.S.C. 154(b) by 238 days.

(21) Appl. No.: 09/900,377

(22) Filed: Jul. 6, 2001

(65) Prior Publication Data

US 2003/0005961 A1 Jan. 9, 2003

(51) Int. Cl.⁷ .............................. G05D 9/12; F16K 21/18; F16K 31/02; F16K 37/00
(52) U.S. Cl. ........................ 137/392; 73/304 R; 73/313; 122/448.1; 122/451 R; 122/504; 122/504.2; 116/109; 137/2; 137/558; 137/624.11; 137/624.14; 307/118; 307/141.4; 340/527; 340/620; 361/178
(58) Field of Search ........................... 137/2, 392, 558, 137/624.11, 624.14; 73/304 R, 304 C, 313; 116/109; 307/118, 144, 141.4; 122/448.1, 451 R, 504, 504.2; 340/527, 618, 620; 361/178

(56) References Cited

U.S. PATENT DOCUMENTS

| | | |
|---|---|---|
| 309,425 A | 12/1884 | Wickersham |
| 850,314 A | 4/1907 | Phipps |
| 1,558,997 A | 10/1925 | Munzinger |
| 1,947,725 A | 2/1934 | Macarthur et al. |
| 2,385,161 A | 9/1945 | Pinkerton |
| 2,752,461 A | 6/1956 | Euler |
| 2,932,287 A | 4/1960 | Goetz |
| 3,116,876 A | 1/1964 | Palm |

(List continued on next page.)

FOREIGN PATENT DOCUMENTS

EP 0 769 662 A1 4/1997

OTHER PUBLICATIONS

Tekmar D269 Device– Data Brochure.
ASHRAE Journal, Feb. 1994, p. 46.
Excerpt from a Forum Sponsored by P&M Industries and Hosted by Dan Holohan, (Apr. 2001).
Holohan, Dan. *Holohan On Hydronics Stuff That Caught My Eye*. Supply House Times, (May 2002).
Wiring Diagram for Latching Relay Added to the VXT–24 Wired to a Hydrolevel Model 400.
Wiring Diagram for Latching Relay Added to the VXT–120 Wired to a McDonnell & Miller 67.
Wiring Diagram for Latching Relay Added to the VXT–120 Wired to a McDonnell & Miller PS 801.
Wiring Diagram for Latching Relay Added to the VXT–120 Wired to a Honeywell RW700.

*Primary Examiner*—George L. Walton
(74) *Attorney, Agent, or Firm*—Delio & Peterson

(57) ABSTRACT

A water feeder controller for a boiler monitors a low water cutoff sensor in a boiler and uses a feed timer to feed water to the boiler for a predetermined feed period of time. The feed timer brings the water level in the boiler well above the low water cutoff sensor. The feed timer supplies water to the boiler only if the low water cutoff sensor continues to indicate a low water level for a delay period of time measured by a delay timer. A resettable display indicates the quantity of water supplied by the water feeder to the boiler based on a feed counter incremented during water feeding. A manual feed button allows water to be manually fed to the boiler. The quantity of water manually supplied to the boiler is also shown on the display. The feed timer and delay timer are preferably implemented in software in a microcontroller in the water feeder controller. A lockout loop in the software prevents overfeeding of water to the boiler in the event of a failure of the low water cutoff sensor.

21 Claims, 2 Drawing Sheets

U.S. PATENT DOCUMENTS

| | | | |
|---|---|---|---|
| 3,335,334 A | | 8/1967 | Albisser |
| 3,417,737 A | | 12/1968 | Shinskey et al. |
| 3,518,974 A | | 7/1970 | Bradley |
| 3,834,357 A | * | 9/1974 | Kaczmarek et al. ........ 122/504 |
| 4,020,488 A | * | 4/1977 | Martin et al. ................ 137/392 |
| 4,027,172 A | * | 5/1977 | Hamelink ................... 137/392 |
| 4,224,606 A | * | 9/1980 | Bartles ........................ 340/620 |
| 4,227,489 A | | 10/1980 | Regamey |
| 4,242,989 A | | 1/1981 | Chamberlain |
| 4,259,982 A | * | 4/1981 | Bartels ........................ 137/392 |
| 4,263,587 A | | 4/1981 | John |
| 4,360,738 A | | 11/1982 | Bartels |
| 4,482,891 A | | 11/1984 | Spencer |
| 4,491,146 A | * | 1/1985 | Sveds ........................ 137/392 |
| 4,541,365 A | | 9/1985 | Jennings et al. |
| 4,565,930 A | | 1/1986 | Bartels |
| 4,619,224 A | | 10/1986 | Takita et al. |
| 4,662,390 A | * | 5/1987 | Hawkins ..................... 137/392 |
| 4,716,858 A | | 1/1988 | Bartels |
| 4,841,770 A | | 6/1989 | Davies |
| 4,903,530 A | | 2/1990 | Hull |
| 4,952,779 A | | 8/1990 | Eaton-Williams |
| 5,110,418 A | | 5/1992 | Garrison et al. |
| 5,220,514 A | | 6/1993 | John |
| 5,224,445 A | | 7/1993 | Gilbert, Sr. |
| 5,440,668 A | | 8/1995 | Jones |
| 5,739,504 A | | 4/1998 | Lyons et al. |

* cited by examiner

WATER FEEDER CONTROLLER FOR BOILER

BACKGROUND OF THE INVENTION

1. Field of the Invention

The present invention relates to devices that automatically supply water to a steam boiler when the water level is low. More specifically, the present invention relates to water feeders for steam boilers of the type used in residential and light commercial heating applications that include a low water cutoff sensor to turn off the burner when the water is below the sensor.

2. Description of Related Art

In conventional boilers of the type used in residential and light commercial heating the water level is monitored with a low water cutoff sensor. When the water level in the boiler drops below the level of the low water cutoff sensor, the burner is turned off until the water level is brought back up to a safe level.

One method of adding water to this type of steam boiler is with an automatic water feeder, which controls a feed valve to supply water to the boiler. When the cutoff sensor senses a low water condition, it stops the burner from firing, and transfers power to the water feeder, allowing it to add make-up water. When the low water cutoff sensor detects that the water level has reached a safe level, it transfers power back to the burner, allowing it to restart and correspondingly disables the water feeder by removing its power.

In conventional water feeder designs of this type, the water feeder is disabled by the low water cutoff sensor as a result of the transfer of power away from the feeder to the burner. Thus the water feeder cannot feed water to the boiler after the burner is re-enabled. One type of low water cutoff sensor uses a float in the boiler, which mechanically drives a switch to transfer power between the burner and the water feeder. In this type of design, the power transfer occurs instantly, as the water level reaches a height sufficient for the float to operate the switch.

Another type low water cutoff sensor uses an electronic probe. With a probe-type electronic sensor, the transfer of power back to the burner can be delayed slightly, allowing a limited amount of additional water to be added above the probe level. However, because the same low water cutoff probe may be used on boilers of various sizes, this delay cannot be too long, as the water feeder cannot be allowed to feed an excess of water into a small boiler.

Water feeders currently available incorporate two timing circuits. The first timer (delay timer) provides for a delay period before the feed valve is activated. This delay allows time for steam within the heating system to condense to water and return to the boiler—thus ensuring that make-up water is required. If the low water cutoff sensor detects that the water level has returned to a safe operating level during the delay period, then no additional water is added and the cutoff sensor re-enables the burner allowing the boiler to operate normally.

The second timer (feed timer) controls the feed valve and adjusts the maximum time that the feeder will supply water to the boiler. After the delay timer has timed out, it triggers the feed timer, which operates the feed valve and begins supplying water to the boiler. When the water in the boiler reaches the low water cutoff sensor, the burner is re-enabled, the feed valve is turned off and the cycle repeats. The feed timer limits the maximum time that water feeding can occur during a feed cycle. Adjustable settings are provided on water feeders to accommodate boilers with different designs and different feed requirements. The best current water feeder designs also include a manual feed override to manually fill the boiler and a lockout feature to prevent the water feeder from cycling/feeding indefinitely in the event of a malfunction of the low water cut-off sensor.

One significant problem with current water feeder designs is that they provide no means for determining how much water has been added to a boiler. Introducing tap water to a boiler too frequently can shorten the life of the boiler. Over time, oxygen rich tap water can rust a cast iron boiler at the water line. Additionally, unwanted and potentially harmful elements, such as lime, can enter the boiler during each feed cycle. If there is a leak in the system, excess deposits can build up in the boiler and produce a layer of material at the bottom of the boiler. This layer typically has poor heat transfer characteristics and can result in the boiler cracking during heating. A water feeder having a display of the amount of water supplied by the water feeder is desirable to allow the owner or installer to determine if the boiler is operating normally, with normal water losses, or if water is leaking from the system, producing rapid water loss.

Another problem with current water feeder designs resides in the fact that the water feeder receives its power from the low water cutoff sensor, which transfers power from the burner to the feeder when the water level is low and removes power from the water feeder as soon as the water level reaches the cutoff sensor. In this type of design the low water cutoff sensor will stop the water feeder during the feed cycle when the level of the water is at or near the level of the cutoff sensor.

Regardless of the duration of the feed timer, the feeder can only fill to approximately the level of the cutoff sensor. While the low water cutoff sensor is installed in the boiler at a safe operating level, it is generally well below the optimum water level for operating the boiler. As a result, boiler operation with a conventional water feeder installed is less efficient than if the boiler were manually filled to operate at a higher water level in accordance with the manufacturer's recommendations.

One solution to this problem has been to use an upper water level sensor to determine when the water feeder has supplied enough water to reach the upper sensor level. The upper sensor is installed above the optimum water level. However, because an upper sensor must be installed at the time the boiler is constructed, and such a sensor increases costs, most boiler manufacturers do not install such a sensor. Consequently, this solution is not suitable for existing boiler installations.

To alleviate this problem installers in the field have made modifications to conventional water feeders by mounting a latching relay near to the water feeder and rewiring the connection between the low water cutoff sensor and the power wiring to the water feeder. The latching relay is installed to supply power to the water feeder after the low water cutoff sensor is satisfied and after the cutoff sensor attempts to remove power from the feeder. This field modification allows the feeder to complete a full feed timer cycle every time and bring the water level above the cutoff sensor. However, field modifications of existing designs are inconvenient at best and require additional installation work. An integrated water feeder design capable of supplying water to above the level of the low water cutoff sensor is desired by the industry.

Bearing in mind the problems and deficiencies of the prior art, it is therefore an object of the present invention to provide a water feeder controller for a boiler having a display for indicating the quantity of water supplied by the water feeder to the boiler.

It is another object of the present invention to provide a water feeder controller for a boiler in which the water feeder raises the water level in the boiler well above the low water cutoff level during the fill cycle and completes an entire predetermined feed cycle during each feed period to add a known quantity of water to the boiler each cycle.

A further object of the invention is to provide a water feeder controller for a boiler that can fill well above the level of the low water cutoff sensor, without requiring a second sensor to detect a water level above the low water cutoff sensor.

Still other objects and advantages of the invention will in part be obvious and will in part be apparent from the specification.

SUMMARY OF THE INVENTION

The above and other objects, which will be apparent to those skilled in art, are achieved in the present invention, which is directed to a water feeder controller for a boiler that monitors a low water cutoff sensor in a boiler and uses a feed timer to feed water to the boiler for a predetermined feed period of time. The feed timer continues to feed water for a full feed cycle to bring the water level in the boiler above the low water cutoff sensor. The feed timer supplies water to the boiler only if the low water cutoff sensor continues to indicate a low water level for a delay period of time measured by a delay timer. A display indicates the quantity of water supplied by the water feeder to the boiler based on a feed counter incremented during water feeding. A manual feed button allows water to be manually fed to the boiler. The quantity of water manually supplied to the boiler is also shown on the display. The feed timer and delay timer are preferably implemented in software in a microcontroller in the water feeder controller. A lockout loop in the software prevents overfeeding of water to the boiler in the event of a failure of the low water cutoff sensor.

More specifically, the invention is directed to a water feeder controller for a boiler that includes an input for receiving a low water signal from a sensor in the boiler, an output for connection to a feed valve capable of supplying water to the boiler at a predetermined feed rate, a delay timer having a delay timer period, a feed counter, a feed timer having a feed timer period and a display.

The delay timer is connected to the input to begin timing for the delay timer period responsive to the low water signal from the sensor. The feed timer is connected to the delay timer to begin timing for the feed timer period after the delay timer period. The feed timer is also connected to the output to turn on the feed valve during the feed timer period, and the feed timer is further connected to the feed counter to increment the feed counter during the feed timer period. The display is connected to the feed counter to display a number corresponding to the quantity of water supplied by the feed valve to the boiler.

The water feeder controller preferably includes a display reset button and a manual feed button. The display reset button is connected to reset the feed counter and thereby reset the display to a zero quantity of water supplied by the feed valve to the boiler. The manual feed button is connected to open the feed valve when it is pressed and is also connected to increment the feed counter as water is being fed to the boiler.

In one aspect of the invention, the water feeder controller includes a microcontroller and the delay timer, the feed timer and the feed counter are all implemented in software in the microcontroller. In the preferred embodiment of this design, the delay timer and feed timer include corresponding delay and feed loops in the software wherein the delay and feed loops repetitively cycle through program steps of the software during the corresponding delay and feed periods of the delay and feed timers.

In the preferred design, the delay loop includes a program step for checking the input to detect the low water signal. The software exits the delay loop without starting the feed timer if the sensor indicates the presence of sufficient water in the boiler during the delay period. When the water feeder is provided with a manual feed button, it is preferred that the delay loop include a program step for determining if the manual feed button has been pressed during the delay period. When the water feeder is provided with a display reset button, it is preferred that the delay loop also include a program step for determining if the display reset button has been pressed during the delay period.

The feed loop includes a program step for determining if the feed loop has been cycling for the feed period and then passes program control to a reset loop. The reset loop includes a program step for checking the input to detect the low water signal. The reset loop starts the delay timer if the sensor indicates a low water level in the boiler. When the water feeder is provided with a manual feed button, it is preferred that the feed loop include a program step for determining if the display reset button has been pressed during the feed period. The feed loop includes a program step for incrementing the feed counter to track water usage.

To prevent the water feeder controller from overfeeding water to the boiler, the software includes a program step for stopping the feed timer from repetitively turning on the feed valve. This is achieved with a program step for checking the number of times the feed timer has been sequentially started. If the number of times the feed timer has been sequentially started exceeds a desired value, program control passes to a lockout loop. The lockout loop prevents the feed timer from being restarted.

In the most highly preferred design, the lockout loop includes a program step for checking the input to detect the low water signal. The software then exits the lockout loop if the sensor indicates the presence of sufficient water in the boiler. This ensures that the low water sensor is functioning.

The invention is also directed to a method of controlling a water feeder for a boiler comprising the steps of:

receiving a low water signal from a sensor in a boiler, the low water signal indicating the presence or absence of sufficient water in the boiler;

delaying for a delay period of time after receiving the low water signal;

checking the low water signal after the delay period;

feeding water to the boiler for predetermined feed period of time if the low water signal indicates insufficient water in the boiler after the delay period; and displaying the quantity of water supplied to the boiler based on the period of time water is fed to the boiler.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
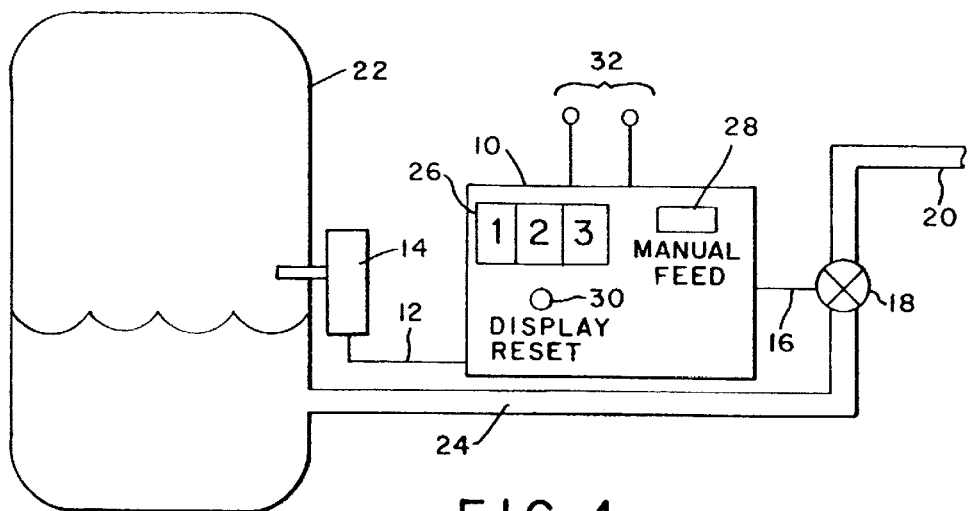
FIG. 1 is a simplified diagram of a water feeder controller according to the present invention connected to control a feed valve supplying water to a boiler having a low water cutoff sensor.

In describing the preferred embodiment of the present invention, reference will be made herein to FIGS. 1–3 of the drawings in which like numerals refer to like features of the invention. Features of the invention are not necessarily shown to scale in the drawings.

Referring to FIG. 1, the present invention includes a water feeder 10 having an input 12 connected to a low water cutoff sensor 14 and an output 16 for controlling an associated feed valve 18. The feed valve 18 is connected to a source of water with pipe 20 and feeds water to boiler 22 through pipe 24 at a predetermined feed rate.

In the preferred design the feed valve 18 is provided with the water feeder controller and has a known flow rate through it. The predetermined rate of flow through the feed valve allows the water feeder controller 10 to display the quantity of water fed on display 26 by timing the duration that the feed valve 18 is kept open by the water feeder controller 10. A manual feed button 28 is provided on the feeder to allow the user to manually open the feed valve and supply water to the boiler 22. The quantity of water fed manually, as well as the quantity of water fed automatically is shown on display 26. A display reset button 30 is provided to reset the display 26 back to zero. The water feeder controller 10 is independently powered through power terminals 32 and does not rely on power being transferred to the feeder from the burner by the low water cutoff sensor 14, as in conventional water feeder designs.

Although the present invention may be implemented with discrete electrical components comprising analog or digital timers and related circuitry, in the preferred embodiment, the functionality of the invention is provided in a software program operated in a microcontroller specifically designed to implement the method and software of this invention. This allows great flexibility in the design of the feeder to provide different modes of operation and additional functions, without increasing cost. It also allows a single clock to be used for all timers.

Figure 2:
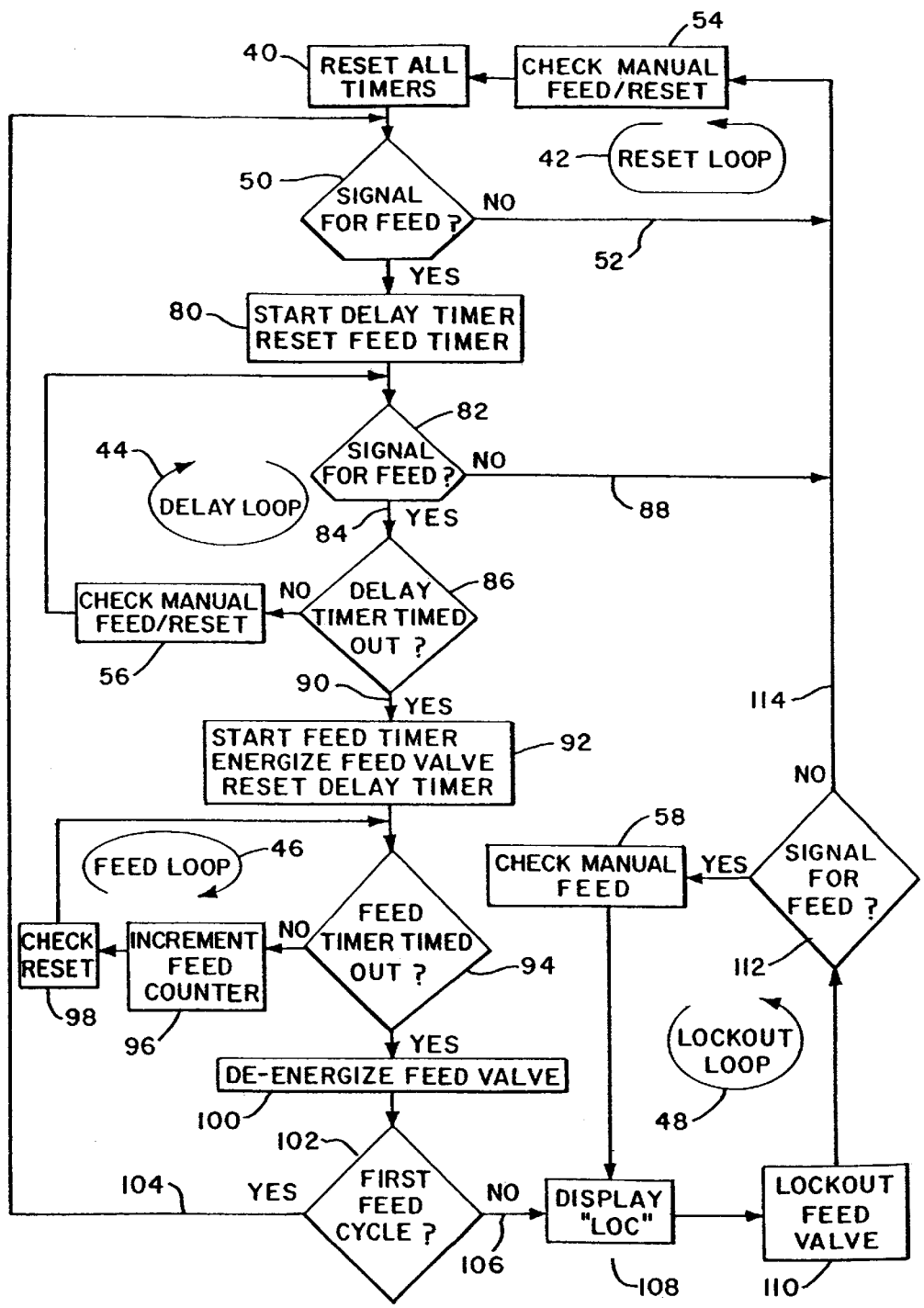
FIG. 2 is a flow diagram of a program used in a microcontroller implementing the method of the present invention.

FIG. 2 provides a basic flow diagram for the software implemented in the microcontroller that provides the features of this invention. When power is initially applied to the water feeder controller 10, the microcontroller loads the program indicated in FIG. 2 from internal memory and begins executing the program at block 40. Power generally remains applied at all times to the water feeder controller 10, except during servicing or repair of the unit.

While power is applied, the microcontroller continuously executes program steps and moves between four principal loops illustrated in FIG. 2, identified as the "reset loop" 42, the "delay loop" 44, the "feed loop" 46 and the "lockout loop" 48. When appropriate conditions are satisfied, such as a timer reaching its timer period, or the water level moving above or below the sensor 14, the program switches from one loop to another.

In the starting block 40, the program resets all timers and initializes program flags and variables used in the program. The timers include a delay timer and a feed timer. These timers may be implemented in any conventional way in software by incrementing a counter, decrementing a counter, or by using programmable timers available in the microcontroller. Program flow then proceeds from block 40 to decision block 50 where the microcontroller checks the input 12 to determine if the low water sensor 14 is detecting a low water condition. Blocks 40 and 50 form part of the reset loop 42.

Under normal operating conditions of the boiler the low water cutoff sensor 14 will be immersed in water and will not be sending a "signal for feed." In that normal operating condition, program flow will exit from decision block 50 on branch 52 and the program will remain in the reset loop 42. Program flow will continue to block 54 and then return to the original block 40. This return to block 40 comprises one pass through the reset loop, and the microcontroller continuously remains in the reset loop as long as the water level in the boiler 22 is above the low water cutoff sensor 14.

Figure 3:
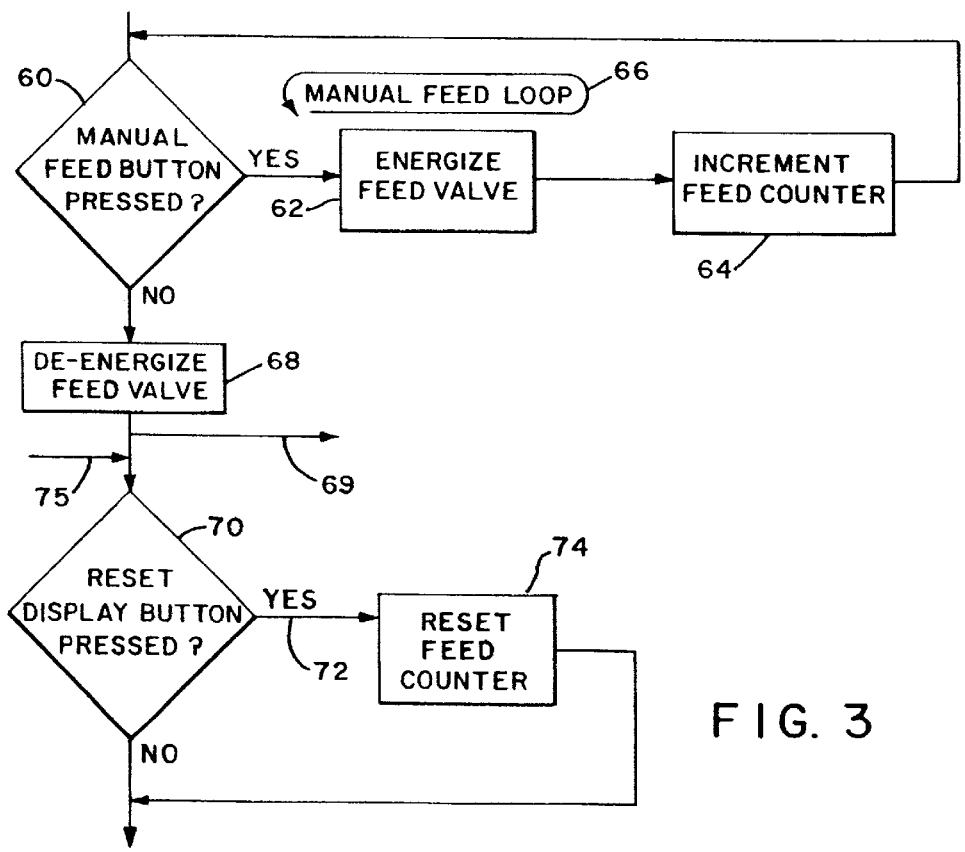
FIG. 3 is a flow diagram of a subroutine used repeatedly in the flow diagram of FIG. 2.

The program steps comprising the "Check Manual Feed/Reset" block 54 are shown in FIG. 3 as a separate flow chart because some or all of the same program steps are used repeatedly in the "Check Manual Feed/Reset" block 56 in the delay loop 44, the "Check Reset" block 98 in the feed loop 46 and the "Check Manual Feed" block 58 in the lockout loop 48. The purpose of the program steps in blocks 54, 56 98 and 58 (shown in FIG. 3) is simply to check whether the user has pressed the manual feed button or the display reset button.

If the manual feed button is pressed (in a "Check Manual Feed/Reset" or "Check Reset" block), the feed valve 18 is energized via output 16 and water is continuously fed to the boiler as long as the manual feed button is held down. If the display reset button is pressed (in a "Check Manual Feed/Reset" or "Check Reset" block), the feed counter is reset to zero, which resets the display 10 to zero.

Referring to FIG. 3, these steps are completed in software by determining in decision block 60 if the manual feed button has been pressed. If it has been pressed, flow proceeds to block 62 and the feed valve 18 is energized to supply water to the boiler. Flow then proceeds to block 64 where the feed counter is incremented. The feed counter is used to keep track of the time the feed valve has been energized. Because the feed valve supplies water at known rate, the feed counter, which is incremented at a uniform rate, represents the length of time that water has been fed and thereby represents the quantity of water supplied to the boiler.

The microcontroller constantly checks the feed counter and displays an appropriate value in display 26 corresponding to the quantity of water supplied to the boiler. Although the program flow chart in FIG. 3 shows that the feed counter is incremented during each pass through the manual feed loop 66, the feed counter is actually incremented at a known rate based on a check of the system clock to ensure correspondence between the number in the feed counter and the length of time that the feed valve has been open. It is not necessary that the number of program cycles through the manual feed loop directly correspond to the number stored in the feed counter provided that the proper correlation between feed time and the feed counter is kept. Those of skill in the art will use conventional techniques to correctly increment the feed timer during the manual feed loop.

Program flow repeatedly returns to decision block 60 in the manual feed loop 66, and flow remains in the manual feed loop as long as the manual feed button is pressed. As soon as the manual feed button is released, program flow exits the manual feed loop and the feed valve is de-energized in block 68. This completes the "Check Manual Feed" portion of FIG. 3.

When a complete "Check Manual Feed/Reset" block, such as block 54 is being executed, program flow then enters the "Check Reset" portion and enters decision block 70 where the program determines if the display reset button has been pressed. If the display reset button has been pressed, program flow exits on branch 72 to the "Reset Feed Counter" block 74 where the feed counter is reset. This resets the display to zero. Program flow then exits the Check Manual Feed/Reset portion of the program at the bottom of FIG. 3 and program flow returns to the exit of blocks 54, 56 or 98.

When the entire "Check Manual Feed/Reset" block 54 or 56 is being executed, program flow enters FIG. 3 at the top and exits at the bottom. When only the "Check Manual Feed" block 58 is being executed, program flow enters FIG. 3 at the top, but exits on branch 69. When only the "Check Reset" block 98 is being executed, program flow enters FIG. 3 on branch 75, and exits at the bottom.

Returning to FIG. 2 and the description of the reset loop, program flow remains in the reset loop 42 until the water level in the boiler drops below the low water cutoff sensor 14. At this point, decision block 50 detects the low water signal from the cutoff sensor 14 and program flow branches towards the delay loop 44. The delay loop is initialized in block 80 by starting the delay timer and resetting the feed timer so that when the feed timer is started, it will time for the full feed period.

Program flow then proceeds into the delay loop where decision block 82 determines if the low water cutoff sensor is still detecting a low water condition. As long as a low water condition remains, program flow will proceed out branch 84 and into decision block 86 where the program determines if the delay timer has timed out. If the delay timer has not yet timed out, then program flow remains in the delay loop, a check is made of the manual feed and reset buttons in block 56 (as described in connection with block 54 and FIG. 3) and flow returns to decision block 82 to complete one cycle through the delay loop 44.

The delay loop can be exited in one of two ways: through branch 88 or through branch 90. As soon as the low water cutoff sensor indicated the need for additional water, the burner was disabled by the boiler control and water began to condense back into the boiler. This condensation process raises the water level and may cause the low water cutoff sensor to change state and begin signaling that no additional water is needed. In this case, program flow exits on branch 88 and returns to the reset loop 42 where the program remains until the low water cutoff sensor again indicates the necessity for additional water. However, if the low water cutoff sensor signals the need for additional water for a period of time longer then the delay period of the delay timer, then the delay timer will time out before the delay loop can be exited on branch 88 and flow will proceed out branch 90 to block 92.

Block 92 initializes the feed loop by starting the feed timer, energizing the feed valve and resetting the delay timer. Program flow then proceeds into feed loop 46 by entering decision block 94. Decision block 94 determines whether the feed timer has timed out and is used to exit the feed loop 46 at the end of the feed period. On the initial entry into the feed loop, the feed timer will not yet have timed out and flow will proceed to blocks 96 and 98.

Block 96 increments the feed counter in the same way as the feed counter was incremented in block 64 as described in connection with FIG. 3. The feed counter is incremented at a uniform rate corresponding to the time that water is fed by the feed valve. The microcontroller continuously maintains the display corresponding to the number in the feed counter. Program flow then proceeds into block 98.

Block 98 in the feed loop includes steps identical to blocks 70 and 74 in FIG. 3. These steps merely check to determine if the user has pressed the reset display button and resets the display, if requested by the user. No check is necessary of the manual feed button because the feed valve is already energized during the feed loop 46 and the feed counter is being incremented during the feed period.

Program flow remains in feed loop 46 for a predetermined feed period set by the feed timer. In the preferred embodiment, the feed period and the delay period are adjustable. Increasing the feed period increases the quantity of water fed to the boiler during the feed loop. The entire duration of the feed cycle will be completed to fill the boiler with a known quantity of water corresponding to the feed period of the feed timer. The signal from the low water cutoff will not prematurely stop the fill cycle as in earlier designs.

Once the feed timer has timed out, program flow proceeds to block 100 and the feed valve is de-energized to stop supplying water to the boiler 22. Program flow proceeds to decision block 102. When program flow first reaches decision block 102, the water feeder will have just completed one feed cycle. Accordingly, program flow will exit decision block 102 on branch 104 and return to decision block 50 inside the reset loop 42. Decision block 50 is below the reset block 40 and will immediately determine whether the low water cutoff sensor is still calling for water, i.e. whether the water level has reached the level of the low water cutoff sensor during the first feed cycle.

If sufficient water has been supplied to bring the water level above the low water cutoff sensor 14, program flow remains in the reset loop and arrives at block 40 where the indication that one feed cycle was just completed is cleared. When the delay loop is exited after at least one pass through the initializing block 40, the decision block 102 will see the next feed cycle as a "first feed cycle and flow will exit on branch 104. However, if the first feed cycle has not been sufficient to raise the water level to the low water cutoff sensor, program flow will immediately enter the delay loop, without passing through initializing block 40 and will then return for a second feed cycle through feed loop 46, ultimately arriving again at decision block 102.

After this second feed cycle without passing through the initializing block 40, program flow will exit decision block 102 on branch 106 and enter the lockout loop 48. In the lockout loop, the display 26 is changed to read "Loc" indicating that the water feeder is locked out and flow passes from decision block 108 to block 110 where the feed valve is de-energized and then to decision block 112. If the low water cutoff sensor continues to indicate a low water condition, flow remains in the lockout loop. During this time, the display continues to indicate "Loc" and the manual feed button is continually checked via block 58 through the manual feed check at program step 60 in FIG. 3.

Entry into the lockout loop occurs when the cutoff sensor fails to indicate that there is sufficient water in the boiler after two successive feed cycles. This can be the result of a very low water condition caused by a major leak or a defective low water cutoff sensor 14. Once the sensor is repaired, water can be manually fed into the system by pressing the manual feed button. Block 58 and manual feed loop 66 will operate to supply water to desired level. At this point, the decision block 112 will exit on branch 114 and flow will return to the reset loop 42. Operation of the system will then continue in the manner described.

Individual adjustments to timer periods may be provided with jumpers on the circuit board or digital data switches or other known methods. Alternatively, preset timer durations and changes to the operating mode may be provided in the software selectable with jumpers or switches by the installer to correspond to different boiler models having known operating characteristics.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A water feeder controller for a boiler comprising:
   an input for receiving a low water signal from a sensor, the signal indicating a low water level in the boiler;
   an output for connection to a feed valve capable of supplying water to the boiler at a predetermined feed rate;
   a delay timer having a delay timer period, the delay timer being connected to the input to begin timing for the delay timer period responsive to the low water signal from the sensor;
   a feed counter;
   a feed timer having a feed timer period,
      the feed timer being connected to the delay timer to begin timing for the feed timer period after the delay timer period,
      the feed timer being connected to the output to turn on the feed valve during the feed timer period, and
      the feed timer being connected to the feed counter to increment the feed counter during the feed timer period; and
   a display connected to the feed counter to display a number corresponding to the quantity of water supplied by the feed valve to the boiler.

2. The water feeder controller for a boiler according to claim 1 further including a display reset button connected to reset the feed counter and thereby reset the display to a zero quantity of water supplied by the feed valve to the boiler.

3. The water feeder controller for a boiler according to claim 1 further including a manual feed button connected to open the feed valve when the manual feed button is pressed, the manual feed button also being connected to increment the feed counter when the manual feed button is pressed.

4. The water feeder controller for a boiler according to claim 1 further including a microcontroller, the delay timer, the feed timer and the feed counter being implemented in software in the microcontroller.

5. The water feeder controller for a boiler according to claim 4 wherein the delay timer includes a delay loop in the software, the delay loop repetitively cycling through program steps of the software during the delay period.

6. The water feeder controller for a boiler according to claim 5 wherein the delay loop includes a program step for checking the input to detect the low water signal, the software exiting the delay loop without starting the feed timer if the sensor indicates the presence of sufficient water in the boiler during the delay period.

7. The water feeder controller for a boiler according to claim 5 wherein the delay loop includes a program step for determining if the delay loop has been cycling for the delay period, the delay loop starting the feed timer thereafter.

8. The water feeder controller for a boiler according to claim 5 further including a manual feed button connected to open the feed valve when the manual feed button is pressed, the delay loop including a program step for determining if the manual feed button has been pressed during the delay period.

9. The water feeder controller for a boiler according to claim 5 further including a display reset button connected to reset the feed counter and thereby reset the display to a zero quantity of water supplied by the feed valve to the boiler, the delay loop including a program step for determining if the display reset button has been pressed during the delay period.

10. The water feeder controller for a boiler according to claim 4 wherein the feed timer includes a feed loop in the software, the feed loop repetitively cycling through program steps during the feed timer period.

11. The water feeder controller for a boiler according to claim 10 wherein the feed loop continues to keep the feed valve turned on during the entire feed period without regard to the low water signal.

12. The water feeder controller for a boiler according to claim 10 wherein the feed loop includes a program step for determining if the feed loop has been cycling for the feed period, the feed loop passing program control to a reset loop thereafter, the reset loop including a program step for checking the input to detect the low water signal, the reset loop starting the delay timer if the sensor indicates a low water level in the boiler.

13. The water feeder controller for a boiler according to claim 10 further including a display reset button connected to reset the feed counter and thereby reset the display to a zero quantity of water supplied by the feed valve to the boiler, the feed loop including a program step for determining if the display reset button has been pressed during the feed period.

14. The water feeder controller for a boiler according to claim 10 wherein the feed loop includes a program step for incrementing the feed counter.

15. The water feeder controller for a boiler according to claim 4 wherein the software includes a program step for stopping the feed timer from overfeeding water to the boiler by repetitively turning on the feed valve.

16. The water feeder controller for a boiler according to claim 15 wherein the program step for stopping the feed timer from overfeeding water to the boiler comprises a program step for checking the number of times the feed timer has been sequentially started.

17. The water feeder controller for a boiler according to claim 16 wherein the program step for checking the number of times the feed timer has been sequentially started passes program control to a lockout loop if the number of times the feed timer has been sequentially started exceeds a desired value, the lockout loop preventing the feed timer from being restarted.

18. The water feeder controller for a boiler according to claim 17 wherein the lockout loop includes a program step for checking the input to detect the low water signal, the software exiting the lockout loop if the sensor indicates the presence of sufficient water in the boiler.

19. The water feeder controller for a boiler according to claim 17 further including a manual feed button connected to open the feed valve when the manual feed button is pressed, the lockout loop including a program step for determining if the manual feed button has been pressed.

20. The water feeder controller for a boiler according to claim 17 further including a display reset button connected to reset the feed counter and thereby reset the display to a zero quantity of water supplied by the feed valve to the boiler, the lockout loop including a program step for determining if the display reset button has been pressed.

21. A method of controlling a water feeder for a boiler comprising the steps of:

receiving a low water signal from a sensor in a boiler, the low water signal indicating the presence or absence of sufficient water in the boiler;

delaying for a delay period of time after receiving the low water signal;

checking the low water signal after the delay period;

feeding water to the boiler for a predetermined feed period of time if the low water signal indicates insufficient water in the boiler after the delay period; and displaying a total quantity of water supplied to the boiler based on the period of time water is fed to the boiler.

* * * * *